US008962507B2

(12) United States Patent
Huson et al.

(10) Patent No.: US 8,962,507 B2
(45) Date of Patent: Feb. 24, 2015

(54) PRODUCT AND PROCESS

(75) Inventors: David Huson, Bristol (GB); Stephen Hoskins, Bristol (GB)

(73) Assignee: University of the West of England, Bristol, Bristol (GB)

(*) Notice: Subject to any disclaimer, the term of this patent is extended or adjusted under 35 U.S.C. 154(b) by 12 days.

(21) Appl. No.: 13/702,878

(22) PCT Filed: Jun. 7, 2011

(86) PCT No.: PCT/GB2011/051069
§ 371 (c)(1),
(2), (4) Date: Jan. 31, 2013

(87) PCT Pub. No.: WO2011/154732
PCT Pub. Date: Dec. 15, 2011

(65) Prior Publication Data
US 2013/0157013 A1 Jun. 20, 2013

(30) Foreign Application Priority Data
Jun. 7, 2010 (GB) .................................. 1009512.3

(51) Int. Cl.
| C04B 35/00 | (2006.01) |
| C04B 33/00 | (2006.01) |
| C04B 33/34 | (2006.01) |
| B28B 1/00 | (2006.01) |
| B28B 7/46 | (2006.01) |
| B32B 18/00 | (2006.01) |
| C04B 35/18 | (2006.01) |
| C04B 35/626 | (2006.01) |
| C04B 35/63 | (2006.01) |
| C04B 35/632 | (2006.01) |
| C04B 35/636 | (2006.01) |
| B29C 67/00 | (2006.01) |

(52) U.S. Cl.
CPC . C04B 33/34 (2013.01); B28B 1/00 (2013.01); B28B 1/001 (2013.01); B28B 7/465 (2013.01); B32B 18/00 (2013.01); C04B 35/18 (2013.01); C04B 35/62665 (2013.01); C04B 35/6316 (2013.01); C04B 35/632 (2013.01); C04B 35/6365 (2013.01); C04B 33/00 (2013.01); B29C 67/0081 (2013.01); *C04B 2235/321* (2013.01); *C04B 2235/3217* (2013.01); *C04B 2235/3244* (2013.01); *C04B 2235/3418* (2013.01); *C04B 2235/3454* (2013.01); *C04B 2235/3463* (2013.01); *C04B 2235/5212* (2013.01); *C04B 2235/5436* (2013.01); *C04B 2235/6026* (2013.01); *C04B 2235/606* (2013.01); *C04B 2235/616* (2013.01); *C04B 2235/94* (2013.01); *C04B 2237/341* (2013.01)
USPC ......................... 501/141; 501/127; 501/153

(58) Field of Classification Search
CPC .... C04B 35/111; C04B 35/652; C04B 35/18; C04B 35/14; C04B 35/13; C04B 35/66; C04B 33/13; C04B 33/04; C04B 33/02; C04B 33/26; B29C 45/0082; B29C 45/0098
USPC ......... 501/127, 128, 129, 130, 131, 141, 143, 501/144; 264/69, 109, 123
See application file for complete search history.

(56) References Cited

U.S. PATENT DOCUMENTS

| 2,181,619 | A | | 11/1939 | Co Van et al. |
| 5,302,563 | A | * | 4/1994 | Rumpeltin et al. ........... 501/111 |
| 5,387,380 | A | * | 2/1995 | Cima et al. ...................... 264/69 |
| 6,375,874 | B1 | * | 4/2002 | Russell et al. .................. 264/28 |
| 7,579,084 | B2 | * | 8/2009 | Saleh ............................. 428/428 |
| 2004/0056378 | A1 | | 3/2004 | Bredt et al. |
| 2005/0197431 | A1 | | 9/2005 | Bredt et al. |
| 2005/0252631 | A1 | | 11/2005 | Bardes et al. |
| 2006/0208388 | A1 | | 9/2006 | Bredt et al. |

FOREIGN PATENT DOCUMENTS

| FR | 2797869 A1 | 3/2001 |
| GB | 146908 | 12/1921 |
| GB | 1028186 | 5/1966 |
| SU | 1328336 | 8/1987 |

OTHER PUBLICATIONS

Marchelli G et al: "New material systems for 3D ceramic printing" Solid Freeform Fabrication Proceedings: Aug. 2009; Proceedings of the SFF Symposium Held in Austin, Texas on Aug. 3-5, 2009, Jan. 1, 2010, pp. 477-486, XP009151625, the whole document.
International Search Report dated Sep. 12, 2011.
Great Britain Search Report issued in related GB Application No. GB1009512.3, dated Oct. 12, 2010.

* cited by examiner

*Primary Examiner* — Noah Wiese
(74) *Attorney, Agent, or Firm* — Banner & Witcoff, Ltd.

(57) ABSTRACT

The invention relates to a composition, which comprises a particulate mixture of: (i) 25 to 80% calcined clay; (ii) 5 to 70% fluxing component; and (iii) 5 to 70% filler component.

29 Claims, No Drawings

PRODUCT AND PROCESS

FIELD OF INVENTION

The present invention relates to a method of making an object, a composition that is useful in the method, and a product which comprises an object made by the method. In particular, the method relates to making ceramic objects by a process known as three-dimensional printing.

BACKGROUND OF THE INVENTION

So-called "three-dimensional printing" is a technique that has been developed and commercialised in various different ways. An early method involved focusing a laser onto a bath of photopolymerisable material to cause the material to polymerise where struck by the laser at and just below the surface of the bath. Layers of solid polymer can be built up to form a solid three-dimensional polymeric object.

Objects made from powdered materials can be made by a method that involves spreading a layer of powdered material over a build bed and depositing a liquid binder onto selected regions of the powder to produce bonded powder material at the selected regions. These steps are repeated a number of times to produce successive layers of selected regions of bonded powder material so as to form the desired object. This method has been described, for example in U.S. Pat. No. 5,387,380, US20051197431, US200610208388 and US200510252631. Three-dimensional printers that work on this principle are available commercially, for example from the company Z Corporation.

Three-dimensional printing with powdered materials has many advantages over conventional methods of manufacture. It allows bespoke objects to be manufactured very quickly and inexpensively. No support structures are needed since the excess powder which remains unbound acts as a support while the bonded layers are being built up to create the object. The object is designed using a computer aided design program and the steps of spreading a layer of powdered material and depositing a liquid binder onto it are controlled by the computer program. This means that objects of many different shapes can be built easily and quickly.

Some publications, including U.S. Pat. No. 5,387,380, have disclosed that "ceramic powder" can be used as the powdered material from which the object is made. Alumina, zirconia, zirconium silicate and silicon carbide are said to be representative ceramic materials. These materials are technically ceramic materials but are not a ceramic body comprising clay, as is used for conventional production of ceramic objects. In practice commercially available powdered materials for use in three-dimensional printing methods are usually limited to plaster and starch. It would, however, be desirable to be able to use the three-dimensional printing method to make ceramic objects.

Some research has been carried out into trying to make ceramic objects using the three-dimensional printing method with a conventional ceramic body (i.e. composition that is used to make ceramic objects) of the type that is typically used in a conventional process for manufacturing ceramics. Conventional ceramic bodies include clay, which exhibits plastic properties.

However, various problems have been encountered with using conventional ceramic bodies in a three-dimensional printing process. Compared to ceramic objects made by conventional ceramic manufacturing methods, the ceramic objects made with the same ceramic body by a three-dimensional printing method tend to have a higher fired shrinkage rate, a higher fired porosity, a lower strength and inferior surface detail. In addition, problems with the green strength of the object before firing can occur, giving rise to difficulties in removing the printed object from the build bed. Further problems have been encountered with the powder layers shifting during the printing process.

The present invention aims to provide an improved method for the production of ceramic objects by three-dimensional printing, and to solve some of the problems encountered to date with the ceramic bodies made by this process. In particular, the present invention aims to allow ceramic objects having improved properties to be made by a three-dimensional printing process, and preferably to allow ceramic objects to be made by a three-dimensional printing process that have comparably good properties to those made by conventional processes.

SUMMARY OF THE INVENTION

A first aspect of the invention provides a composition, which comprises a particulate mixture of:
  (i) 25 to 80% calcined clay;
  (ii) 5 to 70% fluxing component; and
  (iii) 5 to 70% filler component.

A second aspect of the invention provides a method of making an object, the method comprising the steps of:
  (a) providing a composition comprising a particulate mixture of:
    (i) 25 to 80% calcined clay;
    (ii) 5 to 70% fluxing component; and
    (iii) 5 to 70% filler component;
  (b) spreading a quantity of the composition in a layer;
  (c) applying a binder to selected regions of the layer and causing the composition to become bonded in the selected regions;
  (d) repeating steps (b) and (c) a selected number of times to produce successive layers of composition and selected regions of bonded composition in each layer, wherein the selected regions of bonded composition in successive layers are bonded to one another; and
  (e) removing unbonded composition from bonded composition to provide the object.

A third aspect of the invention provides a product which comprises an object made by the process of the second aspect of the invention.

To address the problems encountered with three-dimensional printing of conventional ceramic bodies, a new type of ceramic body has been developed by the inventors of the present invention. The present invention relates according to a first aspect to a composition. This composition is used in the method of the invention according to the second aspect of the invention. The composition comprises a particulate mixture which includes calcined clay, as well as fluxing and filler components. This is in contrast to ceramic bodies used in conventional manufacturing processes, and the ceramic bodies that have been used in the past in three-dimensional printing methods which use clay which has not been calcined, i.e. clay that has plastic properties.

By clay we mean the group of naturally occurring minerals that comprise hydrous aluminium silicates, sometimes with variable amounts of iron, magnesium, alkali metals, alkaline earths and other components, that can be used to make ceramic objects. The term clay covers a wide range of naturally occurring materials as explained below.

The Earth's crust is composed of igneous rocks with an approximate general composition of: $SiO_2$—59.4%; $Al_2O_3$—15.34%; $Fe_2O_3$+$FeO$—6.8%; $CaO$—5.08%; $Na_2O$—3.84%;

MgO—3.49%; K$_2$O—3.13%; H$_2$O—1.15%; TiO$_2$—1.05%; Total over 99%, with other minor components forming the remainder. As the surface of the Earth cooled into a solid, various minerals were formed. A mineral may be defined as a naturally occurring solid formed through geological process that has a highly ordered atomic structure, and specific physical properties. The percentage of the various minerals which make up the crust of the Earth is as follows: feldspar—59.5%; ferro-magnesian group—16.8%; quartz—12.0%; biotite—3.8%; titanium minerals—1.5%; all others—6.4%. Accordingly, feldspar is by far the most common mineral. It is the decomposition of feldspar which largely accounts for clay.

Over the last 2 billion years geological forces and the action of water have acted upon the Earth's crust and has weathered, worn down and redistributed the minerals. A characteristic product of this process is clay. The chemical composition of clay is often quite close to the average composition of the Earth's surface (or crust, given above). For example, red clay can have the composition SiO$_2$—57.02%; Al$_2$O$_3$—19.15%; Fe$_2$O$_3$+FeO—6.7%; CaO—4.26%; Na$_2$O—2.38%; MgO—3.08%; K$_2$O—2.03%; H$_2$O—3.45%; TiO$_2$—0.91%; with the remainder being made up from minor components.

In particular the silica and alumina contents are very similar and account for the bulk of the material. With regard to the molecular composition, as a mineral clay can be said to have the formula Al$_2$O$_3$.2SiO$_2$.2H$_2$O. Kaolinite is the mineralogical name given to this substance but the formula overlooks the complex array of impurities always present.

As noted above, the origin of clay is from feldspar. Commonly occurring feldspars can be illustrated by the following formulas: Orthoclase, K$_2$O.Al$_2$O$_3$.6SiO$_2$; Albite, Na$_2$O.Al$_2$O$_3$.6SiO$_2$; Anorthite, CaO.Al$_2$O$_3$.6SiO$_2$. These are typical formulas and actual specimens of rock may contain two or more alkalis and other impurities such as iron. When feldspar is disintegrated by geological weathering, the alkali part being relatively soluble is carried off by water, leaving the alumina and silica behind. Part of the silica is split off by chemical action. The remaining alumina and silica after long exposure to water become chemically combined with water to form clay.

Many clays have a particle size below 2 microns and investigation under an electron microscope has shown that the clay particles are tablet shaped and by consequence have a very large surface area per unit volume. This property gives clays a high degree of plasticity.

Clays can be classified by their geological origin into two types, primary clays which have been formed on the site of their parent rocks and secondary clays which have been transported primarily by water from the site of the original parent rock. Deposits of primary clay are relatively coarse grained and free from contamination with non-clay minerals. Most kaolins are primary clays. Secondary clays are much more common than primary clays. Transportation by water has an important effect on the clay. Sedimentation of the larger particle in the water means that the particle size of the final deposit of clay is finer than primary clays and can be from a variety of source. Secondary clays can contain iron, quartz, mica and other impurities. Carbonaceous materials in the form of lignite are commonly found in secondary clays due to the sedimentation occurring in areas of heavy vegetation. Examples of clays that are suitable for use in the present invention include kaolin, ball clays, fire clays, stoneware clay and earthenware clay. These types of clay are well known to the skilled person.

Kaolins are primary clays formed by weathering on the site of feldspar. They are coarse in particle size and have low plasticity compared to sedimentary clays.

Kaolins are relatively free from impurities such as iron. In chemical composition kaolins approach the formula of the mineral kaolinite. Kaolin has a melting point above 1800° C.

Ball clays are different to kaolins in their properties, they are higher in iron content, much more plastic and finer in particle size. Ball clays vitrify at around 1300° C.

The term "fire clay" refers to the refractoriness or resistance to heat of this type of clay but in other properties they can vary widely. For example some fire clays are very plastic and some lack plasticity. Any clay which resists fusion or deformation up to around 1500° C. can be called a fire clay.

Stoneware clays are plastic clays which become vitreous at 1200 to 1300° C. The fired colour ranges from buff to brown. Stoneware clays are secondary or sedimentary clays and can vary widely in colour, plasticity and firing range and there is no sharp distinction between what may be called a fire clay or a stoneware clay. Stonewares can be formed from a single clay extracted from a single location and used to produce a wide range of utilitarian wares.

Most of the usable clay found in nature is known as earthenware clay. These clays contain iron and other impurities in sufficient quantity to cause the clay to vitrify between 950 and 1110° C. Again these clays can vary widely in terms of plasticity and fired colour and properties.

Before being used in a manufacturing process to make ceramics, clays are usually formulated into a ceramic body. A ceramic body may be defined as a mixture of clays or clays and other mineral substances which are blended to achieve a specific ceramic purpose. Many clays found in nature would serve reasonably well as they are extracted, but generally it is necessary to create a blend of several materials in order to achieve the desired results. Additions can be made to adjust the colour, texture, plasticity, drying shrinkage, firing shrinkage, lower or raise the maturing temperature in firing and to adjust the thermal expansions to optimise the glaze fit. Aside from the fired technical performance ceramic bodies can be tailored to suit particular forming methods, which include throwing bodies, modelling bodies, casting bodies, jiggering and pressing bodies, and commercial bodies. The materials that constitute a conventional ceramic body fall into three categories, plastics, ie clay, filler components and fluxing components, as discussed below.

During the firing process the clay loses adsorbed water at between 100 and 200° C. Between 500 and 900° C. the chemically bound water in the clay is removed to form a calcined clay. Hence, by calcined clay we mean clay that has undergone heating in order to remove chemically combined water. Once this chemically combined water has been removed the material has changed permanently and the re-addition of water to the material will not produce plastic clay.

An example of calcining for kaolin is as follows. Kaolin-type clays undergo a series of phase transformations upon thermal treatment in air at atmospheric pressure. Endothermic dehydroxylation (or alternatively, dehydration) begins at 550-600° C. to produce disordered metakaolin, Al$_2$Si$_2$O$_7$, but continuous hydroxyl loss (—OH) is observed up to 900° C. and has been attributed to gradual oxolation of the metakaolin. Because of historic disagreement concerning the nature of the metakaolin phase, extensive research has led to general consensus that metakaolin is not a simple mixture of amorphous silica (SiO$_2$) and alumina (Al$_2$O$_3$), but rather a complex amorphous structure that retains some longer-range order (but not strictly crystalline) due to stacking of its hexagonal layers. Further heating to 925-950° C. converts metakaolin to a defect aluminium-silicon spinel, $Si_3Al_4O_{12}$, which is sometimes also referred to as a gamma-alumina type structure. Upon calcination to ~1050° C., the spinel phase ($Si_3Al_4O_{12}$) nucleates and transforms to mullite, $3\ Al_2O_3.2SiO_2$, and highly crystalline cristobalite, $SiO_2$.

The inventors have surprisingly found that the calcining process can be used to produce a ceramic body that is more suitable for three-dimensional printing than normal conventional ceramic bodies which are based on plastic clay materials. In particular, the inventors have found that the plasticity of clay, which is essential for conventional forming methods, can be detrimental for a three-dimensional printing ceramic process. The inventors have discovered that plastic clay can cause layer shifting to occur during printing, producing distortion and deformities to the object and contributes little to the green strength of the printed model. A further problem caused by the use of plastic clay materials in three-dimensional printed bodies is the very high shrinkage that occurs during firing. A very high porosity is produced in ceramic objects made from plastic clay by a three-dimensional printing method.

The inventors have found that calcining the clay component of a ceramic body prior to three-dimensional printing can reduce the fired shrinkage and increase the fired density. The three-dimensional printing process does not require the plastic properties that the conventional clay minerals provide and, indeed, that are essential for a conventional forming processes. Any green strength that may be lost by calcining can be replaced by the binding mechanism of the three-dimensional printing process. If necessary additional binders can be introduced to the body mix as required.

As mentioned above, the composition of the present invention comprises a particulate mixture of at least three components, calcined clay, a fluxing component and a filler component. The composition comprises 25 to 80% calcined clay. In a preferred embodiment, the composition comprises 40 to 65% calcined clay, preferably 45 to 55% calcined clay. Hence, normally the calcined clay makes up the largest component of the ceramic body. If less than 25% of the composition was made up from calcined clay there would be unlikely to be enough clay mineral present in the body mix to form a fired body with the required characteristics and performance. If more than 80% of the composition was made up from calcined clay it would be difficult to form a fired whiteware body that would perform satisfactorily. The lack of flux would need a higher firing temperature and a reduction in silica would cause problems with glaze fit.

As mentioned above, the calcined clay preferably comprises china clay, ball clay, fire clay, earthenware clay or stoneware clay, which has been calcined. A mixture of different types of clay are commonly used. In a preferred embodiment, the calcined clay is china clay (i.e. kaolin) that has been calcined. This is commercially available, for example from Imerys Minerals Limited, under the name Molochite.

The inventors have found that when materials such as Molochite are used as a substitute for the plastic clay minerals in the preparation of a ceramic body for three dimensional printing a ceramic body can be constructed that overcomes many of the problems of three-dimensional printing that occurs with conventional ceramic bodies.

The composition of the invention also includes a filler component and a fluxing component, i.e. it can be described as a ceramic body.

In particular, the composition of the present invention also comprises 5 to 70% fluxing component. It is believed that if the level of fluxing component was outside this range it would be difficult to develop a viable ceramic body. Using more than 70% fluxing component would be likely to cause the body to collapse or distort during the firing. Using less than 5% fluxing component would mean that the body would have a very low fired mechanical strength and would break or crumble when stressed. In a preferred embodiment, the composition comprises 10 to 45% fluxing component, more preferably 15% to 25% fluxing component.

A fluxing component is a mineral that has a melting point between 900 and 1300° C. The purpose of the fluxing component is to help form a glass-like structure during firing to bind all the materials together. The fluxing component controls the fusion or hardening point of the clay and makes it fire to a satisfactory degree of density at whatever temperature is being used. In more detail, fluxing components are used during vitrification, which is the hardening, tightening and the partial glassification of a ceramic body. As the firing temperature increases the fusible components of the body begin to melt into a glass and soak into the surrounding particles binding them together. Eutectic reactions can take place further reducing the melting point of the constituent materials.

Several factors are taken into consideration in designing the blend of components in a ceramic body. The functions of all of the components are temperature dependent. At high temperatures all materials will eventually melt and form a fused glassy solid on cooling. Individual clay minerals can have a very high melting point eg pure kaolin will melt at 1760° C., which is far too high for conventional whiteware ceramic kilns. By adding mineral fluxing components such as feldspars to the body mix, this point can be bought down to a more acceptable temperature of 1000° C. to 1400° C.

The fluxing component can be, for example, potash feldspars, soda felspars, calcium feldspars, lithium feldspars, nephylene syenites, dolomite, talc, frits wollastonite (a calcium silicate mineral) and boric acid (commercially available from Rio Tinto Borax as a product called Optibor).

In the case of Wollstonite and boric acid, both can be added to ceramic bodies as fluxes and can help with increased green strength and firing stability. In a preferred embodiment, the fluxing component is a feldspar, most preferably a potash feldspar. As noted above the term feldspar refers to a group of rock-forming tectosilicate minerals which make up as much as 60% of the Earth's crust.

The composition of the invention also comprises 5 to 70% filler component. It is thought that more using than 70% filler component would have the effect of moving the firing temperature outside of the preferred range and could adversely affect the physical properties of the fired (for example give too high a thermal expansion). Using less than 5% filler component would also be likely to have an adverse affect on the fired physical properties (for example, too low a thermal expansion) and could cause problems with the stability during firing and vitrification.

In a preferred embodiment, the composition comprises 20 to 50% filler component, preferably 25 to 35% filler component.

By filler component we mean a component that has a significantly higher melting point temperature than the fluxing component, and that does not melt at the body maturing temperature.

The purpose of the filler component is to act as an inert component during firing. Filler components are important for obtaining the correct thermal expansion of the fired body, to ensure a good glaze fit. In addition the fillers enable the clay to dry out safely without undue warping or cracking and decrease the amount of shrinkage.

Examples of fillers are silica (in the form of flint, silica sand, quartz) alumina, zirconia, or titania. Fillers can modify the fired characteristics of the ceramic body. In a preferred embodiment, the filler component comprises silica, preferably silica in crystalline or fused form. Silica can adjust the thermal expansion to ensure a good glaze fit and to reduce the tendency of porous whiteware bodies to craze. The use of fused silica may be preferred from a health and safety point of view.

In a further preferred embodiment, filler component comprises alumina in particulate form, preferably at a concentration of between 1 and 10% of the composition. The alumina can improve the fired mechanical strength and impact resistance of the object produced. Other fillers can be added to increase the thermal shock resistance.

The composition of the invention comprises a particulate mixture of the three components described above, optionally with other components. It is important that the components are in particulate form, because the three-dimensional printing method relies on providing a powdered material. The particulate mixture should be thoroughly mixed, so as to produce a consistent product on firing. In a preferred embodiment, the mean particle diameter of the particulate mixture is 100 µm or below, preferably 30 to 100 µm, more preferably 30 to 50 µm.

The layer thickness in a Z Corp process, which can be used in the method of the invention, is 100 µm so the particle size needs to be below this. Bimodal or trimodal particle distributions may give some improvements in fired density. For ceramic materials particle size is generally measured and expressed in sieve mesh size although optical methods can also be used for fine particles.

The composition of the invention can be assembled by blending a mixture of particles of calcined clay, fluxing component and filler component having a suitable particle size. Alternatively, it is possible to start with a commercially available ceramic body which contains plastic clay, fluxing component and filler component, and optionally other components, and heat the body so as to calcine the clay.

Suitable ceramic bodies include bone china, white earthenware and wall tile bodies, calcined and then milled to size. Any commercially available plastic clay based body could be processed, modified and used for 3D printing by this technique. Provided the components are present after calcining in the correct amounts, this commercial ceramic body can then be used as the composition. If necessary, the material can be ground to provide a desirable particle size, and any optional additional components can be added before use.

Examples of whitewares bodies used in the UK along with typical recipes are as follows:

White Earthenware: Ball Clay—25%; China Clay (Kaolin)—25%; Flint (Silica)—35%; Feldspar (Flux)—15%.

Vitreous Hotelware: Ball Clay—25%; China Clay (Kaolin)—25%; Flint (Silica)—30%; Feldspar (Flux)—20%.

High Alumina Hotelware: Ball Clay—40%; alumina—35%; Feldspar—25%.

Hard Paste Porcelain: China clay (kaolin)—53%; quartz sand (silica)—33%; feldspar (flux)—14%.

Bone china: bone ash (calcined animal bones, primarily calcium phosphate)—50%; china clay (kaolin)—25%; cornish stone (flux)—25%.

Sanitary ware: ball clay—25%; china clay—27%; flint (silica)—26%; feldspar or nepheline syenite (flux)—22%.

Parian Ware: China Clay (Kaolin)—30%; Ball clay—10%; Feldspar (flux)—60%;

Low Fire White Body: Ball Clay—50%; Talc (Hydrated magnesium silicate(flux))—45%; Whiting (calcium carbonate)—5%.

Tile Body: China clay (kaolin)—35%; Feldspar (flux)—50%; Quartz (silica)—10%; Talc (Hydrated magnesium silicate (flux))—5%.

The proportions of the different ingredients in the composition, and the presence of additional components, can be varied to fine tune the performance and appearance of the fired material.

In a preferred embodiment of the invention, the composition comprises components additional to the calcined clay, fluxing component and filler component. In particular, it is preferred for the composition to additionally comprise a powder binder. In this connection, organic materials such as cellulose fibres, sugar and maltodextrin can be used. A preferred powder binder Z Corp ZP 15e, which contains finely chopped cellulose, sugar and maltodextrin is a suitable material that can be used. In one embodiment about 12.5% of this binder is used. Higher levels, for example around 25%, of other binders may be appropriate. Alternatively, corn starch, other starches or cellulose material, or polyvinyl alcohol (PVA) could be used. These types of materials, particularly cellulose fibres, can help to bind the composition together before firing, and contribute to providing an acceptable green-strength. The powder binder may be present at a concentration of between 5 and 50% of the composition, preferably between 5% and 10%.

The composition can also advantageously comprise a metal oxide, which would be present in particulate form. A metal oxide that is coloured can be used to provide a colour to the final product. For example, cobalt oxides, ferric oxides, manganese dioxides, copper oxides or commercially prepared ceramic stains/pigments could be used.

As noted below, when the composition of the present invention is used in a method of three-dimensional printing a binder is used to bond selected regions of the composition. A suitable binder is colliodal silica which forms a gel when it contacts an acidic powder. Therefore, it is preferred that the composition is acidic, preferable with a pH of less than 4, more preferable with pH between 2 and 4.

A convenient way to provide acidity is with citric acid. Accordingly, it is preferred that the composition additionally comprises citric acid in particulate form, preferably at a concentration of between 3 and 10% of the composition. However, any powdered acid ground to the required size can be used. Alternately it may be possible to inject carbon dioxide into the powder bed to form carbonic acid with the water content of the binder.

According to a preferred embodiment, the composition comprises 45 to 55% calcined china clay, 15 to 30% silica, 15 to 30% feldspar, 5 to 15% cellulose, and 2 to 8% citric acid. Such a composition has been successfully used in a three-dimensional printing method to result in ceramic objects having excellent properties, in particular, an unfired object having improved green-strength, and on firing an object with improved strength, density and surface appearance.

According to a second aspect, the present invention relates to a method of making an object in a three-dimensional printing process. The first step of the method, (a), involves providing a composition comprising a particulate mixture according to the first aspect of the invention as described above. As mentioned previously, this composition is surprisingly well suited for use in a three-dimensional process, in particular because of the use of calcined clay, rather than plastic clay as in conventional ceramic forming methods and as in previous methods of three-dimensional printing of ceramic objects.

The subsequent steps of the method involve: (b) spreading a quantity of the composition in a layer; (c) applying a binder to selected regions of the layer and causing the composition to become bonded in the selected regions; (d) repeating steps (b) and (c) a selected number of times to produce successive layers of composition and selected regions of bonded composition in each layer, wherein the selected regions of bonded composition in successive layers are bonded to one another; and (e) removing unbonded composition from the selected regions of bonded composition in successive layers to provide the object.

Three-dimensional printing systems that are suitable for use in the present invention are known. The operation of such printers is described in the art, for example in U.S. Pat. No. 5,387,380, US2005/197431 and US2006/0208388, which are incorporated herein by reference. Suitable three-dimensional printers are commercially available, for example from Z Corporation, such as the ZPrinter® 310+, ZPrinter® 450, ZPrinter® 550 and ZPrinter® 650 models.

The typical Z Corporation three-dimensional printing system consists of the following parts: feed piston, build piston, spreading apparatus and print head gantry. The feed piston is used to measure and dispense the composition. This is spread in a layer across the build piston by means of a spreading apparatus. Once the initial layer is spread, the lowest cross section of the object is printed by applying a binder to selected regions of the layer. This can involve spraying a binder solution on the composition by means of an inkjet print head on the print head gantry. The binder and composition qualities are such that where they meet, in the selected region, the composition becomes bonded, optionally after further treatment such as heating or irradiating, for example with UV light. After the initial layer is printed, the feed piston raises one layer thickness and the build piston lowers one thickness and the spreader then spreads a successive layer of composition over the first layer. The print heads are then used to print the next layer (i.e. apply binder to the selected regions). This process continues until the object is completed. Once the object has been completed and the binder has been allowed to dry sufficiently, the object can be removed and excess, unbonded, powder can be blown off to provide the object.

In the three-dimensional printing method of the invention, the object is designed using a computer aided design program, and steps (b), (c) and (d) of the method are controlled by the computer program. Suitable software is, for example, Rhino4 CAD software. Once an object has been designed, the computer aided design program slices the three-dimensional virtual model into layers of approximately 100 μm thick and "prints" i.e. deposits binder onto the selected regions of each layer sequentially on the successive layers of composition.

In the Z Corporation printers, the standard binder which is available from Z Corporation comprises colliodal silica. It is convenient to use standard materials and the use of silica is advantageous in the present invention since it is not destroyed during a firing process and becomes an integral part of the ceramic object, in contrast to an organic binder which would be burnt away during firing. Accordingly, in one embodiment of the present invention the binder is a liquid binder, which preferably comprises silica, and more preferably comprises colloidal silica. In this embodiment the binding effect works when the composition is acidic so that the colloidal silica is activated when it comes into contact with the composition, and forms a gel. Accordingly, it is preferred that the composition is acidic, as described above.

It is, however, possible to use alternative binding systems in the present invention. Any binder that can be employed in a three-dimensional printing method and can bind a composition according to the present invention, optionally with additional components to react with or activate the binder can be used. A preferred binding system includes a sugar/maltodextrin cellulose binder powder mixed with powdered clay body, and UV-curable photo-polymer resins. By including a flux material such as wollastonite in the body composition, at levels of up to 70%, potential high shrinkage/contraction problems can be overcome.

In particular, 3D powder printing by using a sugar/maltodextrin binder powder mixed with powdered clay body has been developed by the University of Washington in Seattle. This approach uses Z Corporation printers but replaces the Z corp powder with a mixture of sugar maltodextrin and powdered clay body. The Z corp type of liquid binder is replaced by alcohol which is jetted onto the powder bed. The alcohol dissolves the sugar/maltodextrin powder which coats the clay particles and sticks them together. When dry the model is removed from the bed and fired. Another 3D forming method involves using UV-curable photo-polymer resins. This process is often termed stereolithography and machines using variations of this process are produced by several manufacturers.

It is important for the integrity of the object that the selected regions of bonded composition in successive layers are bonded to one another. This will occur when the binder is deposited on successive layers sequentially, and the selected regions in each layer are in contact, as will be the case in the present invention.

The final step of the printing method, (e), involves removing unbonded composition from the bonded composition (i.e. the selected regions of bonded material in successive layers). For conventional three-dimensional printing methods using plaster or starch as the powdered material this can be done within a couple of hours with no further treatment. When ceramic objects are produced, it is preferred that the bonded and unbonded composition are subjected to a drying step prior to step (e). This is to improve the green-strength of the object, and ensure that it has adequate strength to withstand movement and separation from the supporting unbound composition. Preferably the drying step involves heating the bonded and unbonded composition to at least 40° C., preferably at least 60° C., more preferably between 70 and 120° C. The drying step can last for around an hour.

The three-dimensional printed object can then be further treated to render it suitable for use as a ceramic object. The object can be subjected to all or any of the following steps.

The object can be subjected, before firing, to an additional drying step, (f), which involves placing the object in a drying oven. This can improve the green strength.

The temperature of the drying oven is usually between 50 and 200° C., preferably 80 to 210° C. The exact temperature and duration of drying will depend on the composition and the size of the object.

The object is usually subjected to a firing step, (g), which involves placing the object in a kiln and firing the object. Conventional firing temperatures and durations can be employed, depending on the composition of the object. For example, the temperature can be between 900 and 1500° C., and is preferably 1000 to 1300° C. The ramp rate is normally between 50 and 300° C. per hour, preferably around 100° C. per hour, with soaking (i.e. maintaining the top temperature) for up to 5 hours.

As is conventional in ceramic manufacturing processes, the fired object is normally glazed, in step (h), which involves glazing the object to provide a glazed object. Any conventional glaze can be used. The final step can be to fire the glazed object, in step (i), which involves placing the glazed object in a kiln and firing the glazed object. This firing step is usually at a slightly lower temperature than the initial firing step, (g).

For example, firing temperatures can be between 800 and 1300° C., and is preferably 900 to 1200° C.

As discussed above, an advantage of the present invention is that the resultant objects have advantageous properties, compared with previous ceramic objects produced by three-dimensional printing. In particular, they have a higher fired shrinkage and density than previous ceramic objects produced by three-dimensional printing, which tended to be very porous.

There is, however, likely to be a degree of porosity in the objects according to the present invention. Accordingly, one embodiment includes the step of applying to the object an infiltrate. This can have the advantageous effect of increasing the density and reducing the porosity of the object. The performance of the standard plaster-based Z Corp materials used in 3D printing can be enhanced by the use of various infiltrants such as wax, cyanoacrylate adhesive and low viscosity acrylic and epoxy resins to improve strength surface texture and colour. These types of materials are unsuitable for 3D printed ceramics as they would be burnt away in the firing.

The inventors have discovered that it is possible to infiltrate the 3D printed ceramic with colloidal suspensions of materials such as silica, alumina or zirconia, usually aqueous colloidal suspensions, or sodium silicate. The infiltrate is normally applied after the first firing, and the object is then re-fired. The depth of penetration of the infiltrant is dependent on the pore structure of the ceramic and a second firing is required. Colloidal suspensions in alcohol may also be used to infiltrate the 3D printed ceramic prior to firing.

An aqueous solution of sodium silicate can advantageously be used to infiltrate the 3D printed ceramic. The sodium silicate can act as a fluxing agent and on firing can increase the density of the ceramic body and give a self glazing effect on the surface.

Using a colloidal silica or sodium silicate infiltrate can lead to unexpected improvements in the physical properties of the object, including increased strength, and a better surface finish on glazing. Colloidal silica can be used as a post firing infiltrant to increase the surface density. Alternatively, colloidal silica in a suspension, such as an alcohol suspension, or an aqueous solution of sodium silicate can be used prior to firing.

The method of the present invention can be used to make any object, and indeed an advantage of three-dimensional printing is that it is possible to make objects with shapes and configuration that are very difficult or impossible to achieve by a conventional manufacturing process. For example, the object made in the present invention could be an item of crockery, preferably a bowl, plate, cup, or teapot; a vase; a figure; a bust; a paperweight; another decorative object; a mould; or a tile. By this method it is possible to form ceramic articles that would be impossible to produce using conventional making or moulding techniques, such as enclosed or nested objects and objects with fine detail and undercuts.

A further advantage of the present invention is that more than one object can be made in one process. In particular, in a preferred embodiment, the selected regions to which binder is applied are arranged so that more than one object is provided. Objects can be provided that are adjacent, or even interlinked.

In a preferred embodiment, the present invention can be used to make a tile, which has a representation of a two-dimensional image, commonly called a photo-ceramic tile.

Photo-ceramic tiles are a 19th Century technique for producing a continuous tone photographic image on a ceramic tile by using a lightly stained glaze covering a relief map of an image. The high points of the relief represent the light tone of the image and the low points of the relief represent the dark tones of the image i.e. the tile has a three-dimensional contoured surface that represents the two-dimensional image. In the $19^{th}$ Century such tiles were made in a laborious process using a hand-sculpted relief as a mould to make a ceramic tile. More recently digital technologies have been used to in which the image was converted to a relief using software and the digital file was converted to a tool path and sent to a computer numerical controlled (CNC) milling machine to cut the image into a substrate that was then used as a mould for a ceramic tile.

While the CNC method successfully reproduces a relief image, to form a tile mould to obtain the required resolution a fine cutting tool is needed, which can result in extended machining times. To machine a mould to produce an A4 size image could take up to 16 hours, and could only be used to make a series of the same image. This process is described in WO2005/014306.

The inventors have discovered that the three-dimensional printing method of the present invention can be used to make photo-ceramic tiles in a much reduced time. In particular, in the method of the present invention a photo-ceramic tile can be made in around 20 minutes, compared to 10 to 12 hours on average to make a relief by the CNC method, which then needs to be added to the tile.

Accordingly, in a preferred embodiment of the present invention, the object comprises a three-dimensional surface which is a representation of a two-dimensional image, and a computer program is used to generate data corresponding to the three-dimensional surface from the two-dimensional image. Computer program software that can be used includes Geomagic Studio, or Rhino. The two-dimensional image can be derived from a photograph, painting or print, and the object is a tile with a three-dimensional contoured surface that represents the two-dimensional image.

The tile is preferably provided with a glaze which overlays the contoured surface, preferably wherein the outer surface of the glaze is substantially planar. The glaze is normally transparent, partially transparent or translucent. Suitable glazes are known in the art, for example glazes from Potterycrafts can be used, such as green glaze Potterycrafts P2038 low sol transparent glaze, Potterycrafts P4130 black glaze stain, or lead-containing stains. Further information on glazes can be found in the reference book, "Clay and Glazes for the Potter", by Daniel Rhodes.

The present invention opens up the possibility of using three-dimensional ceramic printing as a rapid manufacturing process for photo-ceramic tiles. By using the known digital relief generation techniques incorporating multiple images side by side, it is possible produce many different individual tiles, each one with a different image, in a single process. This would, for the first time, bring the production of photo-relief tiles into the area of mass customisation.

Accordingly, in a preferred embodiment the selected regions to which binder is applied are arranged so that more than one object is provided wherein the object is a tile and more than one tile is provided, more preferably wherein at least 10 tiles are provided, more preferably wherein 50 to 200 tiles are provided.

According to a third aspect, the invention provides a product which comprises an object made by the method of the second aspect of the invention. The object can be any object which can be made by this process, as described above. The products made by the process of the present invention, using the composition comprising calcined clay, have better physical properties than objects made with conventional ceramic bodies by a three-dimensional printing process. In particular, they have a higher strength (both green-strength and fired strength), are more dense, less porous, and have improved surface properties.

DESCRIPTION

Examples

In this specification, all percentages are by weight.

Example 1

Preparation of Ceramic Body

The average particle size of Molochite (PotteryCrafts), silica (PotteryCrafts), feldspar (PotteryCrafts) and cellulose was measured using a Retsch AS 200 vibro sieve to ensure that that it did not exceed 100 µm. Any materials that were over 100 µm were ground separately using a Gladstone Engineering Ball Mill to ensure that were no particles exceeded 100 µm in diameter. The basic ceramic body mix comprising 5 kg Molochite, 2.5 kg silica and 2.5 kg feldspar all with a particle size of less than 100 µm was weighed out and mixed by hand and repeatedly screened. 1.25 kg of Z Corp zp15e powder was then added and mixed by hand for 30 minutes to ensure even distribution of components. This mixture was then re-screened and transferred to the build bed of a Z Corp Z 310 plus 3D printer.

Example 2

Preparation of a Ceramic Body 500 grams of citric powder (Fisher Scientific) was dry ground using a Gladstone Engineering Ball Mill to an average particle size (APS) of 50 µm. The average particle size of Molochite (PotteryCrafts), silica (PotteryCrafts), feldspar (PotteryCrafts) and cellulose was measured using a Retsch AS 200 vibro sieve to ensure that it did not exceed 100µ. Any materials that were over 100µ were ground separately using a Gladstone Engineering Ball Mill to ensure there were no particles exceeding 100µ diameter. The basic ceramic body mix comprising 5 kg Molochite, 2.5 kg silica and 2.5 kg feldspar all with a particle size of less than 100µ was weighed out and mixed by hand and repeatedly screened. 1 kg cellulose and 0.5 kg ground citric acid was then added and mixed by hand for 30 minutes to ensure even distribution of components. Since this particular composition was intended to produce ceramic articles using a ZCorp 310+ 3D printer, the pH of the body mix was checked to ensure it was acid enough to activate the manufacturer's binder (pH less than 4). This was done by mixing 1 g of the body mix in 100 ml of water and measuring the pH with Ecotestr pH2 pH meter. The pH was less than 4.

Example 3

Production of a Cup

A cup was drawn in Rhino 4, a computer aided design (CAD) software package. The resultant mesh was saved as a stereolithography file (.stl) in the CAD software and subsequently exported into the Z Corporation® printer driver software (Z Print™). 10 kg of the ceramic body prepared by the method described in Example 2 was placed in the printer bed of a ZCorp 310+ 3D printer. The 3D print parameters were set up in ZPrint™ and 3D print/build was run. The entire build was then removed from the bed and placed in a drying oven at 75° C. for 8 hours. This drying step ensures that any water absorbed from the binder is removed and increases the green strength. After drying, the formed cup was carefully removed from the print bed and de-powered carefully by blowing and brushing with a fine paint brush. The de-powdered cup was then returned to the drying oven at 110° C. for 8 hours to ensure that the cup was completely dry prior to firing. The cup was then placed in a kiln and fired at a ramp rate of 100° C. per hour up to 1175° C. than soaked at 1175° C. for 45 minutes. The cup was then glazed by dipping in PotteryCrafts P2038 low sol transparent glaze. The glazed object was fired at a ramp rate of 100° C. per hour up to 1050° C.

Example 4

Production of a Photo-Ceramic Tile

A photograph of a person's face was taken using a Canon IXUS 80 digital camera, exported and a relief of the photograph was generated. The relief file was exported to Geomagic Studio. A 'blank' tile was constructed in using computer aided design software (Rhino 4). The mesh was exported to Geomagic Studio where it was combined with the previously generated photo relief. The combined tile and relief were exported to the Z Corporation® printer driver software (Z Print™). 10 kg of the ceramic body prepared by the method described in Example 2 was placed in the printer bed of a ZCorp 310 plus 3D printer. The 3D print parameters were set up in ZPrint™ and 3D print/build was run. The entire build was then removed from the bed and placed in a drying oven at 75° C. for 8 hours. This drying step ensures that any water absorbed from the binder is removed and increases the green strength. After drying the formed object (tile and relief) was carefully removed from the print bed and de-powered carefully by blowing and brushing with a fine paint brush. The de-powdered object was then returned to the drying oven at 95° C. for 8 hours to ensure that the object was completely dry prior to firing. The object was then placed in a kiln and fired at a ramp rate of 100° C. per hour up to 1175° C. then soaked at 1175° C. for 45 min. The object was then glazed using a specially prepared lightly stained green glaze Potterycrafts P2038 low sol transparent glaze with an addition of 0.5% by weight of Potterycrafts P4130 black glaze stain. The glazed object was fired at a ramp rate of 100° C. per hour up to 1050° C.

The invention claimed is:

1. A composition, which comprises a particulate mixture of:
   (i) 25 to 80% calcined clay;
   (ii) 5 to 70% fluxing component; and
   (iii) 5 to 70% filler component, wherein the filler component comprises alumina in particulate form.

2. A composition according to claim 1, wherein the mean particle diameter of the particulate mixture is 30 to 50 µm.

3. A composition according to claim 1, wherein the composition additionally comprises cellulose fibres.

4. A composition according to claim 3 in which the cellulose fibres are present at a concentration of between 5 and 10% of the composition.

5. A composition according to claim 1, wherein the composition additionally comprises an acid in particulate form, wherein the acid is present at a concentration of between 3 and 10% of the composition, and wherein the acid is citric acid.

6. A composition according to claim 1, wherein the composition comprises 45 to 55% calcined clay.

7. A composition according to claim 1, wherein the calcined clay comprises china clay, ball clay, fire clay, earthenware clay or stoneware clay which has been calcined.

8. A composition according to claim 1, wherein the composition comprises 15% to 25% fluxing component.

9. A composition according to claim 1, wherein the fluxing component is a feldspar, Wollstonite or dolomite type flux.

10. A composition according to claim 1, wherein the composition comprises 25 to 35% filler component.

11. A composition according to claim 1, wherein the filler component comprises silica in crystalline or fused form.

12. A composition according to claim 1, wherein the alumina is present at a concentration of between 1 and 10% of the composition.

13. A composition which comprises a particulate mixture of 45 to 55% calcined china clay, 15 to 30% silica, 15 to 30% feldspar, 5 to 15% cellulose, and 2 to 8% citric acid.

14. A composition according to claim 1, which comprises a metal oxide selected from the group comprising cobalt oxides, ferric oxides, manganese dioxides and copper oxides.

15. A method of making an object, the method comprising the steps of:
   (a) providing a composition comprising a particulate mixture of:
      (i) 25 to 80% calcined clay;
      (ii) 5 to 70% fluxing component; and
      (iii) 5 to 70% filler component;
   (b) spreading a quantity of the composition in a layer;
   (c) applying a binder to selected regions of the layer and causing the composition to become bonded in the selected regions;
   (d) repeating steps (b) and (c) to produce successive layers of composition and selected regions of bonded composition in each layer, wherein the selected regions of bonded composition in successive layers are bonded to one another; and
   (e) removing unbonded composition from the bonded composition to provide the object.

16. A method according to claim 15, wherein the bonded and unbonded composition are subjected to a drying step prior to step (e), wherein the drying step involves heating the bonded and unbonded composition to between 70 and 120° C.

17. A method according to claim 15, wherein the binder comprises colloidal silica and the composition comprises citric acid.

18. A method according to claim 15, in which the binder includes water and alcohol.

19. A method according to claim 15, additionally comprising the steps of:
   (f) drying the object;
   (g) firing the object;
   (h) glazing the object to provide a glazed object; and
   (i) firing the glazed object.

20. A method according to claim 15, additionally comprising the step of applying to the object an infiltrate, wherein the infiltrate comprises sodium silicate or a colloidal suspensions of silica, alumina or zirconia.

21. A method according to claim 15, wherein the object is: an item selected from the group consisting of a bowl; a plate; a cup; a teapot; a vase; a figure; a bust; a paperweight; a decorative object; a mould; and a tile.

22. A method according to claim 15, wherein the selected regions to which binder is applied are arranged so that more than one object is provided, wherein the object is a tile and more than one tile is provided.

23. A method according to claim 15, wherein the object is designed using a computer aided design program, and steps (b), (c) and (d) of the method are controlled by the computer program.

24. A method according to claim 23, wherein the object comprises a three-dimensional surface which is a representation of a two-dimensional image, and a computer program is used to generate data corresponding to the three-dimensional surface from the two-dimensional image.

25. A method according to claim 23, wherein the two-dimensional image is derived from a photograph, painting or print, and the object is a tile with a three-dimensional contoured surface that represents the two-dimensional image.

26. A method according to claim 25, wherein the tile is provided with a glaze which overlays the contoured surface.

27. A product which comprises an object made by the process of claim 15.

28. A method according to claim 27, wherein the glaze is transparent, partially transparent or translucent.

29. The product of claim 27 wherein the filler component comprises alumina in particulate form.

* * * * *